United States Patent
Patel et al.

(10) Patent No.: US 10,736,433 B2
(45) Date of Patent: Aug. 11, 2020

(54) FIRE RESISTANT FABRIC

(71) Applicant: FINE COTTON FACTORY INC., Toronto (CA)

(72) Inventors: Biren Patel, Toronto (CA); Krunal Patel, Toronto (CA)

(73) Assignee: FINE COTTON FACTORY INC., Toronto, ON (CA)

( * ) Notice: Subject to any disclaimer, the term of this patent is extended or adjusted under 35 U.S.C. 154(b) by 373 days.

(21) Appl. No.: 14/908,865

(22) PCT Filed: Jul. 29, 2014

(86) PCT No.: PCT/CA2014/050718
§ 371 (c)(1),
(2) Date: Jan. 29, 2016

(87) PCT Pub. No.: WO2015/013825
PCT Pub. Date: Feb. 5, 2015

(65) Prior Publication Data
US 2016/0183694 A1    Jun. 30, 2016

Related U.S. Application Data

(60) Provisional application No. 61/859,533, filed on Jul. 29, 2013.

(51) Int. Cl.
| A47C 27/08 | (2006.01) |
| A47C 31/00 | (2006.01) |
| B32B 5/02 | (2006.01) |
| B32B 5/26 | (2006.01) |
| A41D 31/08 | (2019.01) |

(52) U.S. Cl.
CPC ............ *A47C 31/001* (2013.01); *B32B 5/026* (2013.01); *B32B 5/26* (2013.01); *A41D 31/085* (2019.02); *B32B 2262/0246* (2013.01); *B32B 2262/0269* (2013.01); *B32B 2262/062* (2013.01); *B32B 2262/08* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2307/3065* (2013.01); *B32B 2479/00* (2013.01); *B32B 2571/00* (2013.01)

(58) Field of Classification Search
CPC ...................................................... A47C 27/08
USPC ......... 5/644, 640, 689, 652.2, 702, 940, 954
See application file for complete search history.

(56) References Cited

U.S. PATENT DOCUMENTS

| 6,309,565 B1 | 10/2001 | Stowell et al. | |
| 2004/0002272 A1* | 1/2004 | Land | D02G 3/182 442/190 |
| 2004/0060120 A1* | 4/2004 | Murphy | A47C 31/001 5/698 |
| 2006/0135014 A1* | 6/2006 | Murphy | A47C 31/001 442/304 |

(Continued)

*Primary Examiner* — Fredrick C Conley

(57) ABSTRACT

The present invention relates to a fire resistant, double knit fabric and methods of manufacturing the same. The fire barrier double knit fabric of the present invention includes a face side having a yard including a fire retardant fiber, and a back side having a yard including a charring yarn. The fabric resistant fabric of the present invention can be made in a stretchable tubular sock that can be used on all mattress widths (one size fits all) or as an open form for upholstering, lamination of mattress ticking.

14 Claims, 4 Drawing Sheets

(56) References Cited

U.S. PATENT DOCUMENTS

2007/0004302 A1     1/2007   McKinnon et al.
2008/0299854 A1   12/2008   Hilleary et al.
2012/0255128 A1* 10/2012   Sytz .................... A47C 27/008
                                                                                             5/698

* cited by examiner

FIRE RESISTANT FABRIC

CROSS REFERENCE TO RELATED APPLICATIONS

This application is a national stage application under 35 U.S.C. 371 of International Application No. PCT/CA2014/050718, filed Jul. 29, 2014, which in turn claims the benefit under 35 U.S.C. 119(e) of U.S. Provisional Ser. No. 61/859,533, filed Jul. 29, 2013, the contents of each of which are hereby incorporated by reference into the present disclosure.

FIELD OF THE INVENTION

The present invention relates in general to fire resistant fabrics, more specifically, to fire resistant, double knit fabrics for covering articles such as foam and latex mattresses and other foamed covered furniture.

BACKGROUND OF THE INVENTION

The United States Consumer Product Safety Commission issued Standard for the Flammability (Open Flame) of Mattress Sets that establishes performance requirements (the "16 CFR 1633 requirements") based on research conducted by the National Institute of Standards and Technology. Mattresses and mattress foundation sets that comply with the requirements will generate a smaller size fire with a slower growth rate, thus reducing the possibility of flashover occurring. During the test, the mattress or mattress set is located on top of a steel rig and exposed to two T-shaped burners with a total burner heat output of 27 kW. The side burner is applied for 50 seconds and the top burner is applied for 70 seconds. The fire is then allowed to develop freely. The smoke gases produced during the test are collected by a hood and exhaust system from where samples are taken for gas analysis. To meet the 16 CFR 1633 requirements, a mattress must maintain a heat release rate of less than 200 kW during the first 30 minutes of the test and, also, that the total heat release be less than 15 MJ in the first 10 minutes of the test.

Foam and latex mattresses are a challenge to meet the 16 CFR 1633 requirements. To meet the 16 CFR 1633 requirements, mattress manufacturers are using fire retardant fabrics to cover the mattress or mattress set. One type of fire retardant fabric for use as upholstery, mattress ticking, panel fabric and other items are formed of natural or synthetic fibers and then treated with fire-retardant chemicals. (See, for example, U.S. Pat. No. 6,309,565). It is also known in the textile industry to produce fire retardant fabrics using inherently fire retardant yarns made of modacrylic, flame resistant rayon, oxidized polyacrylonitrile fiber (OPF) to name a few.

US Pat. Publ. No. 2012/0255128 (U.S. '128) describes a fire retardant (or resistant) (FR) fabric for use as a fire retardant barrier. The FR barrier of U.S. '128 consists of a knit fabric fire barrier including a looped terry knitted fabric with a jersey side and a looped terry side, the jersey side including a fire retardant yarn and a meting yarn and the looped terry side including a fire retardant yarn. According to this patent application, the loops in the jersey side are very high loops (between 4 mm and 8 mm). The loops and melting yarn are essential elements of U.S. '128. These two essential elements of the fabric disclosed in U.S. '128, however, represent two major disadvantages. First, the terry loops or tuck stitching used in U.S. '128 restrict stretch of the fabric to less than 20%. Any more stretch would thin the fabric and substantially reduce its FR effectiveness. The limited stretch of the fabric of U.S. '128 makes it impractical (or very expensive) to produce in a sock fabric, as the fabric manufacturer would need a custom machine for each mattress size. Second, the melting yarn is liquefied the insulating structure of the fabric collapses which reduces the barrier's capability to reflect and flame also it speeds up the disintegration of strengthening fiber.

U.S. '128 teaches that the current stretchable knit products do not pass of the 16 CFR 1633 test because of the light weight of the products. U.S. '128, however states that an increase in weight significantly reduces the feel of the mattresses.

U.S. '128 also includes a tuck stitch in the fabrics disclosed therein. All current knit fabrics have some stretch, however the fabrics used to cover foam and/or latex have low stretch due to their use of tuck-stitch fabric construction. Current designs require tuck-stitch fabric construction to prevent the fabric from stretching open and reducing the flame barrier performance, thus, failing the 16 CFR 1633 requirements. The tuck-stitch fabric construction is also impractical to produce a one-size fits all sock form of the fabric for any type of mattress size.

Thus, what is needed is a comfortable flame resistant fabric with improved performance during the 16 CFR 1633 test and that it may be used without modification on a wide range of mattress sizes.

Presently, no stretchable knit product has passed the 16 CFR 1633 requirements.

In view of the foregoing, a new and innovative fire resistant knit that overcomes the deficiencies of the prior art is needed.

SUMMARY OF THE INVENTION

The present invention provides for a fire barrier knit fabric. The fire barrier knit fabric of the present invention may be four-way stretchable and free of loops. The fire barrier, double knit fabric of the present invention can be provided with an increased weight. When used to cover a mattress, the fire barrier, double knit fabric of the present invention can be provided with an increased weight, without reducing the feel of the mattress. The fire barrier fabric of the present invention can be used to make a variety of articles of manufacture, including, mattress insulations, fire protective clothing, gloves, socks, welding bibs and blankets, fire blankets, floor boards, padding, protective head gear, linings, cargo holds, drapes, insulating fire walls (or buildings, ships, oil platforms and aircraft), upholstery, seat covers, automobile interiors, pillow covers, and the like.

In one embodiment, the present invention provides for a fire resistant, double knit fabric comprising: (a) a first side comprising a fire retardant yarn, (b) a second side comprising a charring yarn, and (c) a middle layer connecting the first and the second sides, the middle layer comprising a middle yarn. When used to cover an article, such as a mattress, the first side is disposed on the outer face of the fabric, and the second side is disposed against a surface of the article.

In one embodiment of the fire resistant double knit fabric of the present invention, the fire retardant yarn of the first side comprises fire retardant fibers wrapped around a structural filament. In aspects of the invention, the structural filament includes fiber glass, metallic filaments, metallic filaments, ceramic filaments or combinations thereof. In aspects of the invention, the structural filaments are included in yarns from about 100 to about 700 denier. In aspects of the invention, the structural filaments are included in yarn counts from 8/1 to about 32/1 cotton count. Cotton count may be used in this document as to be consistent with the linear density of the yarn being used. In one embodiment of the present invention, cotton count for the first side is 8/1 to 32/1 and for the second side is 8/1 to 32/1.

In one embodiment of the present invention, the first side comprises a blend of the fire resistant yarn and a charring yarn.

In another embodiment of the present invention, the fire retardant yarn comprises inherently fire retardant fibers including modacrylic, flame resistant cellulose, meta-aramid, para-aramid, fiberglass, melamine, polybenzimidazole, polybenzoxazole, oxidized polyacrylonitrile fiber (OPF), carbon, novoloid, and combinations thereof.

In one embodiment of the present invention, the fire retardant yarn is a blend of OPF and char forming, fire resistance cellulose.

In another embodiment of the present invention, the fire retardant yarn comprises OPF.

In another embodiment of the present invention, the charring yarn includes char forming fibers of cellulose, wool or a combination thereof. In aspects of the invention, the cellulose and wool fibers are fire retardant treated.

In another embodiment of the present invention, the second side includes at least about 10% of charring wool or charring cellulose fibers.

In another embodiment of the present invention, the second side includes charring yarns of modacrylic, fire retardant cotton, fire retardant viscose, fire retardant wool, fire resistance rayon, and combinations thereof.

In another embodiment of the fire resistant fabric of the present invention, the charring fiber is wrapped around a structural filament. In aspects of the invention, the charring fiber is wrapped around the structural filament to produce yarns of about 100 to 700 denier.

In another embodiment of the present invention the middle yarn comprises at least about 10% charring cellulose fibers or charring wool fibers.

In another embodiment of the present invention, the middle yarn comprises yarns substantially similar to that of the first side, the second side or a combination thereof.

In another embodiment, the fire resistant double knit fabric of the present invention includes about 25% of the fire retardant fiber.

In another embodiment, the fire resistant double knit fabric of the present invention includes from about 35% to about 75% of the charring yarn.

In another embodiment, the fire resistant fabric of the present invention is four-way stretchable.

Embodiments of the fire resistant fabric of the present invention has a four way stretch of more than about 20%.

In another embodiment, the fire resistant fabric of the present invention includes a four way stretch and recovery of 150% stretch across the total width of the fabric, and 50% stretch in length, which is perpendicular to the width.

In another embodiment, the fire resistant fabric of the present invention is devoid of loops.

In another embodiment, the fire resistant fabric of the present invention is devoid of a melting yarn.

In another embodiment, the fire resistant fabric of the present invention is devoid of tucking stitches.

In another embodiment, the present invention provides for a sock having fire resistant properties. In one embodiment, the sock is made of a fire resistant double knit fabric of the present invention. In one embodiment, the sock is a tubular sock. In another embodiment the sock is width 41" tubular.

In one embodiment, the sock of the present invention includes a non-fire resistant panel disposed to cover a portion of an article less likely to be exposed to fire or heat. In one embodiment the article is a mattress, and the non-fire resistant panel is disposed to cover a portion of the mattress not subject to the 16 CFR 1633 requirements.

In one embodiment of the sock of the present invention, the sock is configured to cover an article being protected from heat or fire. In one aspect the article is a mattress. In another embodiment the sock is configured to cover all mattress sizes.

In one embodiment, the present invention provides for a method of manufacturing a double knit, fire resistant fabric having a 4 way stretch and recovery. In one embodiment, the method includes: (a) providing a circular double knit machine; (b) providing a fire retardant fiber for the first side of the fire resistant fabric, (c) providing a charring fiber for a second side of the fire resistant fabric; and (d) knitting a circular double knit fabric having 4 way stretch and recovery with the fire retardant fiber and the charring fiber, thereby manufacturing the double knit, flame resistant fabric having a 4 way stretch and recovery.

In one embodiment, the present invention provides for a method of manufacturing a double knit, fire resistant fabric having a 4 way stretch and recovery. In one embodiment, the method includes: (a) providing a circular double knit machine, the double knit machine having a cylinder side and a dial side; (b) feeding the cylinder side of the machine with a first feed comprising a fire retardant yarn; (c) feeding the dial side with a second feed comprising a charring yarn; (d) feeding the machine with a third feed for feeding a middle yarn of the fire resistant double knit fabric; and (e) knitting the double knit fabric with the first feed, second feed and third feed, thereby providing a fire resistant fabric having a 4 way stretch and recovery.

In one embodiment of the methods of the present invention, the methods are devoid of a tuck stitch setting.

BRIEF DESCRIPTION OF THE DRAWINGS

The following figures illustrate various aspects and preferred and alternative embodiments of the invention.

DESCRIPTION OF THE INVENTION

Figure 1:
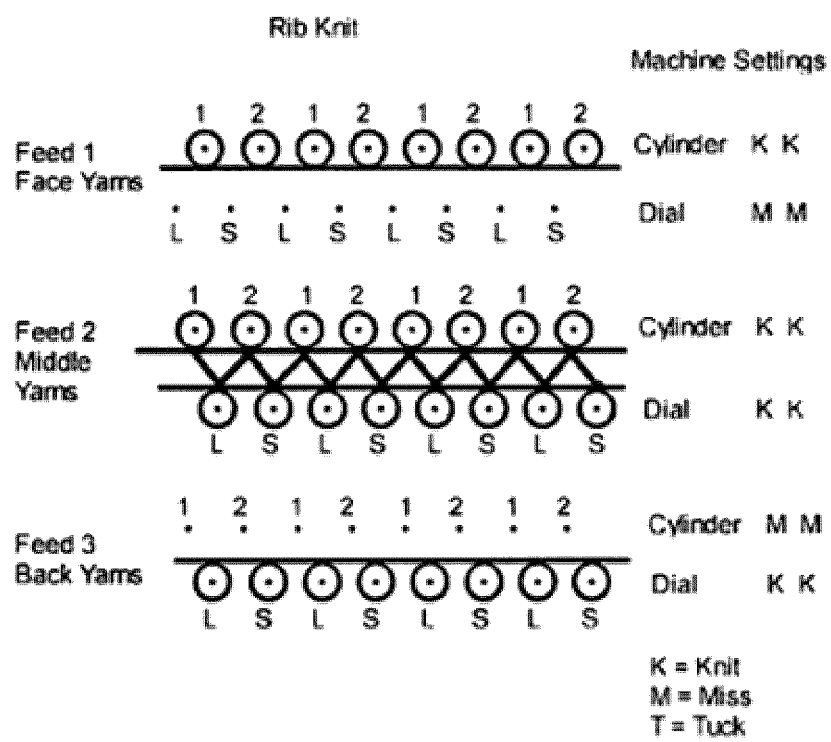
FIG. 1 illustrates a knitting sequence of fire resistant double knit fabric construction (rib knit).
Figure 2:
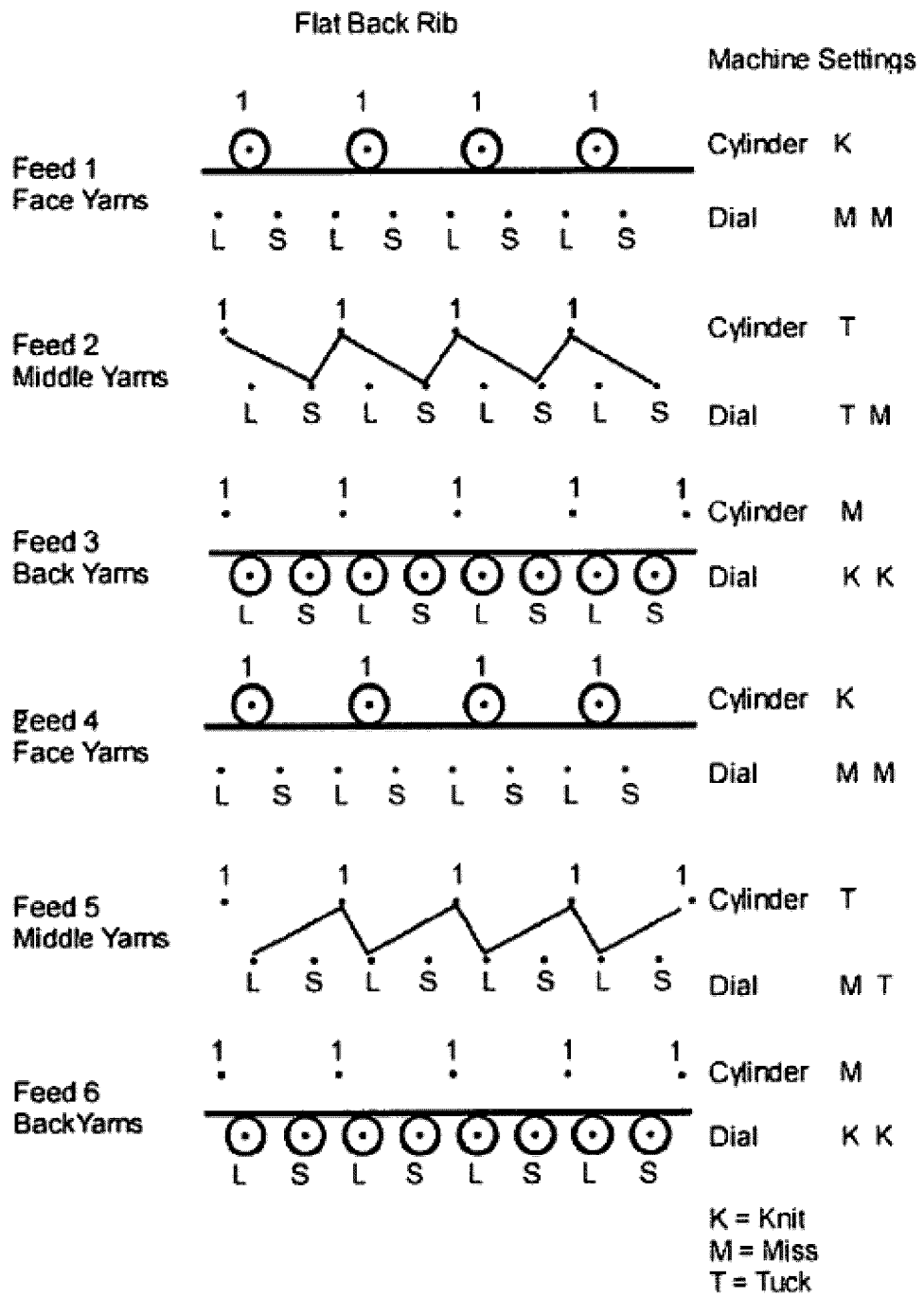
FIG. 2 illustrates a knitting sequence of fire resistant double knit fabric construction (flat back rib).
Figure 3:
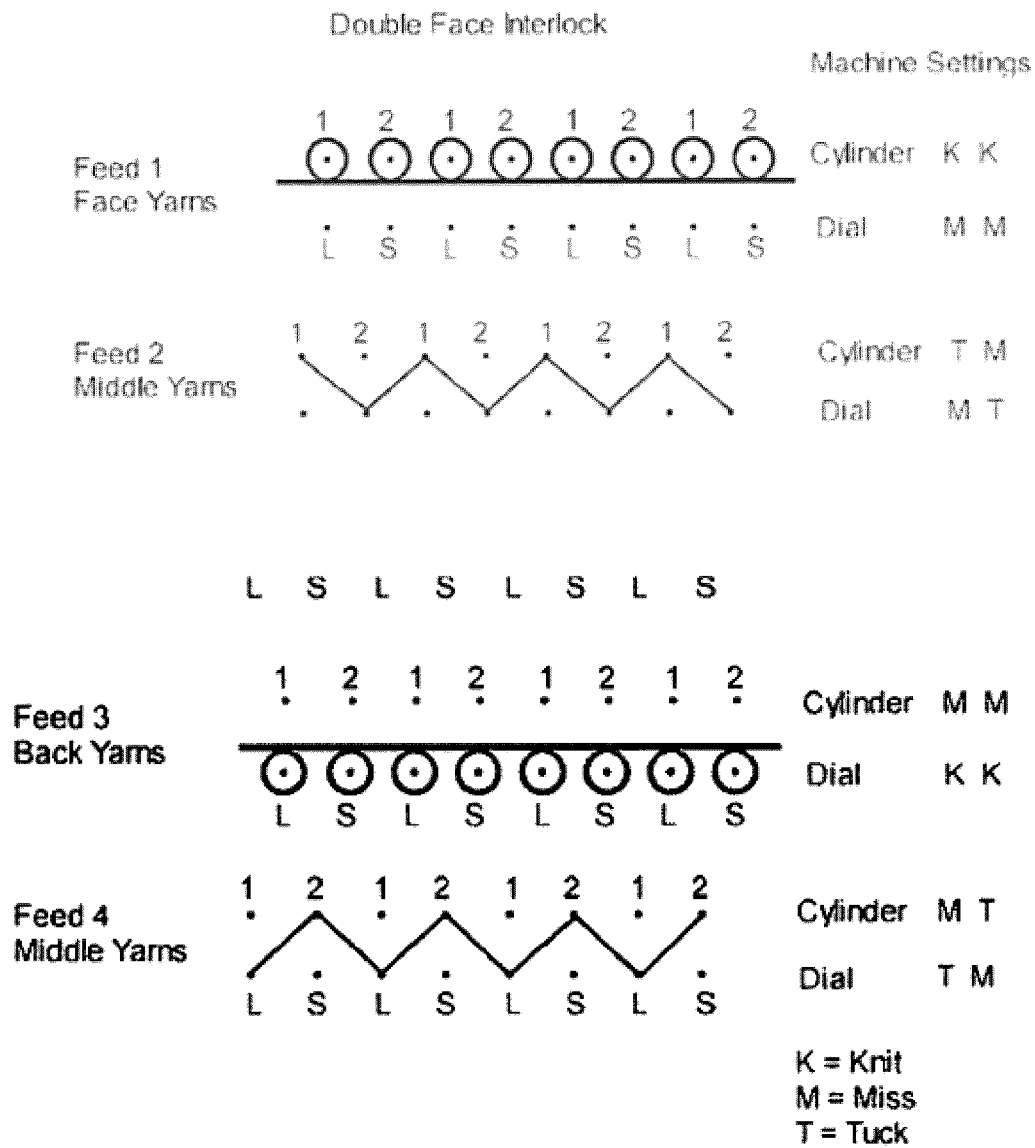
FIG. 3 illustrates a knitting sequence of fire resistant double knit fabric construction (double face interlock).

Definitions Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. In order to aid in the understanding and preparation of the within invention, the following illustrative, non-limiting, examples are provided.

The term "knit" may be used as a verb (to make (a fabric or garment) by intertwining yarn or thread in a series of connected loops either by hand, with knitting needles, or on a machine) or as a noun (a fabric or garment made by knitting).

The terms "fiber" and "fibers", as used in the specification and appended claims, refer to any slender, elongated structure that can be carded or otherwise formed into a thread. Fibers are characterized as being no longer than 25 mm. Examples include "staple fibers", a term that is well-known in the textile art.

The term "yarn", as used in the specification and appended claims, refers to a structure comprising a plurality of threads.

The term "fire retardant" refers to a fabric, felt, yarn or thread that is slow to burn. The term "fire resistant" refers to a fabric, felt, yarn or strand that is difficult to burn.

As used in the specification and appended claims, the term "fire" is meant to include flame and/or heat.

Fire Resistant Knit Fabric

The fire resistant knit fabric of the present invention includes a side having a fire retardant yarn, and another side having charring yarn or a combination of charring yarn and a fire retardant retardant. The fire resistant knit fabric of the present invention may be a fire resistant double knit fabric and it may be used to manufacture a plethora of articles. One particular application of the fire resistant double knit fabric of the present invention is the manufacturing of fire resistant covers—which may be referred to as "socks"—for mattresses that meet the requirements of 16 CFR 1633 when used to protect foam or latex mattresses. As such, in one embodiment, the present invention provides for a fire resistant or fire barrier, double knit fabric, which may comprise (a) a first side including a fire retardant yarn, and (b) a second side including a charring yarn. The fire resistant, double knit fabric of the present invention may also include (c) a middle layer connecting the first and second sides and the middle layer may include a yarn selected from: a charring yarn, a fire retardant yarn, or a combination thereof. When used to cover an article to be protected from flames, such as a mattress, the second side is disposed against a surface of the article or mattress, and the first side may be disposed on the outer face of the fabric.

Face yarns, which form the face of the fire resistant fabric (i.e. the side of the fabric that may be exposed to flames, which may also be referred to as the first side), may preferably retain structure when exposed to flame. The back yarns, also referred to as the second side, which forms the side of the fabric that touches the article to be covered and protected from flames, includes charring fibers, that is fibers that form a char when exposed to flames. The char may adhere to the surface of the article being protected and to the middle layer of the fire resistant fabric thereby creating a char air barrier that may cut off oxygen supply and proves a layer of heat insulation, thereby helping in preventing the spreading of fire.

The fibers of the fire retardant yarns and the charring yarns may be wrapped around a structural filament, such as fiber glass. The structural filament core may maintain structure of the fire barrier, reflecting and insulating the article being protected from flame and heat.

The double knit, fire resistant fabric of the present invention may be designed using innovative knit structures that enhances fire resistance by blocking heat and flame using a blend of fire retardant fibers, and blocks oxygen supply using charring fibers. Unlike the teachings of U.S. '128, the double knit, fire resistant fabrics of the present invention may be, in one embodiment, free of a melting yarn, free of loops, and may be devoid of tucking stitches.

The fire resistant fabrics of the present invention may have a mass of about 200 gms/m$^2$ to about 400 gms/m$^2$. Preferably, the flame resistant fabric of the present invention may have a mass of about 220 gms/m$^2$ to about 380 gms/m$^2$. Even more preferably, the flame resistant fabric of the present invention may have a mass of 280 gms/m$^2$.

The first or face yarn may have from about 25% to about 80% of a fire retardant fiber. The first side may also include from about 8% to about 28% of a structural filament such as fiber glass. In one embodiment, the fiber glass is at least 15%.

The second, or back yarn, may include from about 15% to about 35% of the structural filament and from about 40% to about 80% of the charring fiber.

The total content in the fabric of the present invention of fire retardant fiber may be from 10% to about 60%. The total charring fiber content in the fabric of the present invention may be from 8% to 70%. The total content of the structural filament may be from about 15% to about 45%.

In one particular embodiment, the double knit, flame resistant fabric of the present invention may include oxidized polyacrylonitrile fiber (OPF), fire resistant viscose, fiberglass and Protex C™, which is modacrylic fibers wrapped around a glass fiber. The content (by mass) may be of about 10-60% OPF, about 8-35% fire resistance viscose, about 20-45% fiberglass, and about 12-50% Protex C™.

In one embodiment of the present invention, the yarn count may be: face yarn: 14/1 cotton count (cc) (could be 8/1 cc to 32/1 cc) content 44% OPF/30% fire resistant rayon/26% glass fiber); back yarn: 21/1 cc (could be 8/1 to 32/1 cc) 67% Protex C/33% glass fiber.

The fire resistant, double knit fabric of the present invention may include a four way stretch and recovery of about 150% stretch in fabric width (WALES) and 50% stretch in the fabric length (COURSES).

(a) Charring Yarn

A charring yarn may be used as a feed for one of the side of the knit fire resistant fabric of the present invention and the middle feed. A charring yarn may also be included in the face or first side of the fire resistant fabric of the present invention. If the fire resistant, double knit fabric of the present invention is used for covering an article, the charring yarn may be used for the side of the fire resistant fabric that would be touching or in contact with the article, such as a mattress. When exposed to flames, the charring side may start to char before the face of the fire resistant fabric starts to disintegrate.

Charring yarns suitable for use in the present invention include charring yarns of modacrylic, cellulose fibers, wool and combinations thereof. Charring cellulose fibers may include, cotton or rayon, charring wool. The charring yarns may also be provided as fire retardant yarns of modacrylic, cellulose and wool, and combinations thereof.

The charring yarn may also be provided as charring strands wrapped around a structural filament.

In one embodiment of the present invention the back yarn includes at least about 10% of the charring strands.

(b) Fire Retardant Yarn

For most applications, the side of the fire resistant double knit fabric facing human occupation, which may also be referred to as the first side, and which, in the case of a mattress sock, would be the side facing away from the mattress, will include a fire retardant yarn. The fire retardant yarn may include an inherently fire retardant fiber or a fiber treated with a fire-retardant.

Various fire-retardants known in the art may be applied to a fiber. Most typically, these fire-retarding agents include sodium borate or sodium or ammonium phosphates or phosphate esters of various types. Proprietary fire-retarding mixtures, such as, for example, Spartan™ AR 295 Flame Retarding from Spartan Flame Retardants Inc. of Crystal Lake, Ill., include both organic and inorganic constituents. Another non-limiting example of a fire-retardant chemical is GLO-TARD FFR2, which is an ammonium polyphosphate fire-retardant from GLO-TEX International, Inc. of Spartanburg, S.C. Another example is Fire Retard 3496, which is a phosphate ester supplied by Manufacturers Chemicals, L.P. of Cleveland, Tenn. Another fire-retardant agent that may be used in the present invention is Flovan CGN, a multi-purpose phosphate-based flame retardant supplied by Huntsman (Salt Lake City, Utah). Another contemplated fire-retardant additive is SPARTAN™ AR 295, a diammonium phosphate based flame retardant from Spartan Flame Retardants, Inc. (Crystal Lake, Ill.). Borax, sodium tetraborate decahydrate, is another fire-retardant additive available from U.S. Borax Inc. (Valencia, Calif.). Borax typically comes in powder form, but is dissolved in water and can be sprayed onto the substrate.

Each of these known fire-retardants, as well as other fire-retardants formulated to be effective with materials which are primarily cellulosic fibers, may be operable in this invention. The effective dose of each could be determined by anyone reasonable or ordinary skilled in the art through experimentation and testing.

As noted above, certain fibers may have enhanced reversible thermal properties and may be used in the present invention. This includes fiber types having inherent fire-resistant properties. Some nonlimiting examples of these fibers types include oxidized polyacrylonitrile fibers (OPF), Basofil Merge 80 melamine fiber, VISIL® silica/silicate filled flame retarding rayon fiber by Sateri International Group (Oy, Finland) and FR Corona® is a silica-filled rayon flame retarding fiber from Daiwabo Rayon Co. Ltd. (Japan), modacrylic, flame retardant viscose, meta-aramid, para-aramid, melamine, fiberglass and so forth.

Manufacture of Flame Resistant Double Knit Fabrics

Double knit fabrics may be manufactured on circular dial and cylinder weft knitting machines which are capable of producing interlock and interlock based fabrics, with cylinder diameters of 34 inches (86.36 cm), more or less, and a circumference of more or less 106.8 inches (271.27 cm). The needle gauge (thickness) should be more or less 0.49 mm with a linear spacing of more or less 18 npi (needles per inch). To achieve the optimum overall tubular fabric circumference, the needle count should be more or less 1872 n (needles).

Structure may be of a 3 feeder sequence repeat and set up as follows:

Feed 1—should knit all cylinder needles, with all dial needles at the welt position. (idle) Run-in of yarn may be set at about 345 inches per revolution of cylinder, with a yarn tension of about 2-3 grams. Dial stitch length may be set at zero to minimize excessive force on yarns.

Feed 2—should knit all dial needles and all cylinder needles and have a similar stitch length on both the dial and cylinder. Dial cast off timing may be set at a one needle delay to minimize barre issues. Run-in of yarn may be set at about 500 inches per revolution of cylinder, and may have a yarn tension of about 2-3 grams.

Feed 3—should welt (idle) all cylinder needles and knit all dial needles. Yarn used in this position may have a run-in of about 340 inches per revolution and may have a tension of about 2-3 grams. To achieve optimum fiber percentage on both face and back of fabric and yield, run-ins and tension may vary. Stitch length on cylinder may be set to zero to minimize excessive force on yarns used.

Dial height in relation to cylinder may be set about 1.8 inches to optimize required fabric stretch and recovery. Fabric take-up tension should be set to minimize yarn bursting and or other fabric defects. All run-ins and tensions may be controlled with positive yarn supply systems as to control fabric quality and yield consistency. Note: 14 npi (neeles/inch) double knit machine to 22 npi double knit machine can be use to make this fabric. Yarns on the feeds describe can be interchangeable. One exemplary embodiment of the present invention, a double knit rib structure to produce fire resistance fabric using two different yarn (yarn→A and yarn→B) may be as follows. The structure has one side solid with yarn A and other side with yarn A and yarn B mixed stitches. To make this kind of structure using yarn A on feed #1 cylinder needle are all knitting and dial needle are all welt (not knitting), knitting only one side (cylinder side) of fabric with yarn A. Using yarn A on feed #2 cylinder and dial both needle are knitting. Knitting both side of fabric keep both side of fabric together, and it may also help to keep one side solid with Yarn A and mixed with dial side with yarn B. Using yarn B on feed #3 cylinder needle are all welt and dial needle are all knitting create the second side of the fabric. Repeating this structure the fabric comes out from the machine having one side solid with yarn A and other side come with mix yarn A and B.

Applications

The fire resistant double knit fabric of the present invention may be used as fire resistant barrier for articles such as mattresses, including foam and latex mattresses, upholstered furniture, including chairs, couches, seats (including car and theater seats), and so forth. The fire resistant, double knit fabric of the present invention may also be used in the manufacture of fire protective clothing, gloves, socks, welding bibs and blankets, fire blankets, floor boards, padding, protective head gear, linings, cargo holds, drapes, insulating fire walls (or buildings, ships, oil platforms and aircraft), automobile interiors, and the like.

The fire resistant double knit fabric of the present invention may be used in the manufacture of a sock for mattresses. The sock may be a tubular sock. Due to the relatively high stretch of the fire resistant fabric of the present invention, the sock made of the fire resistant fabric of the present invention can span all commercial mattress sizes. The sock may be provided as a tubular, width 41" sock.

In one embodiment, the fire resistant fabric of the present invention may be knitted into a continuous sock that a mattress can slide into. The sock may then be closed at its aperture to provide fire protection to all mattress surfaces.

Figure 4:
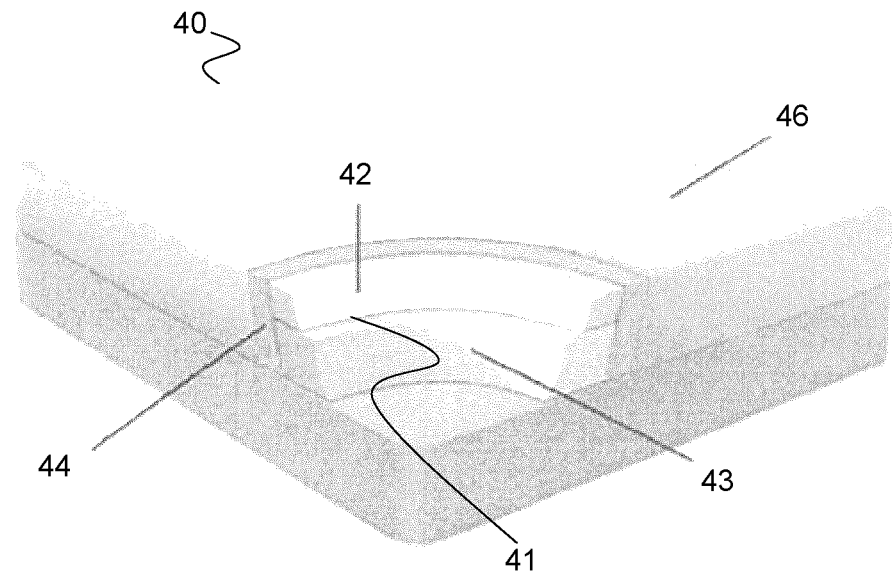
FIG. 4 illustrates a mattress in accordance to one embodiment of the present invention.

Referring to FIG. 4, the fire resistant mattress 40 includes a mattress 41, a fire resistant sock 44, and a conventional knitted ticking 46. In FIG. 4, the mattress 41 is illustrated as having a latex foam layer 42 and an orthopedic layer 43.

The fire resistant sock may include an external side having a fire retardant yarn and an interior side having a charring yarn. The sock may also include a middle yarn comprising a fire retardant yarn, a charring yarn or a combination thereof.

In one embodiment, 50% or more of the sock surface includes the fire resistant yarn. In another embodiment 60% or more of the sock surface includes the fire resistant yarn. In another embodiment 70% or more the sock surface includes the fire resistant yarn. In another embodiment 90% or more the sock surface includes the fire resistant yarn. At least 8% of the sock may include a charring yarn.

Figure 5:
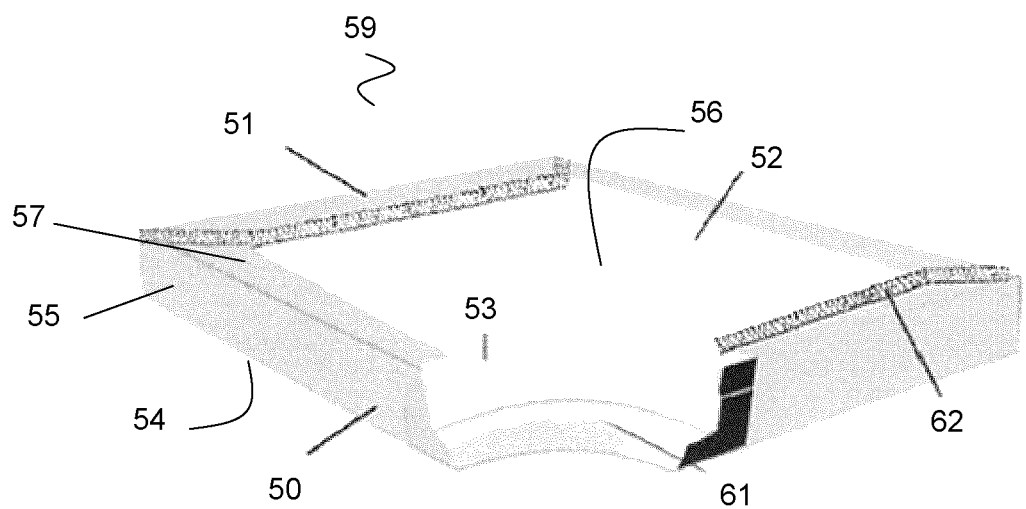
FIG. 5 illustrates a mattress in accordance to one embodiment of the present invention.

Fire retardant yarns carry a substantial cost. An innovative design of a fire resistant, double knit sock for a mattress, which may meet the 16 CFR 1633 requirements and cost substantially less, is shown in FIG. 5. FIG. 5 illustrates a mattress 59 shown bottom side up. The mattress 59 is covered by a modified fire resistant double knit sock 50 of the present invention. The mattress 59 may include a foam layer 61 and an orthopedic foam 53. Conventional mattresses include a top side 54, a bottom side 56 (the mattress 59 is shown bottom side up), and lateral walls 55 between the top 54 and the bottom 56. The fire resistant modified sock 50 may be designed as a panelized sock, in which about 60% of the sock is fire resistant and about 40% is not fire resistant. This innovation may reduce costs of manufacturing the sock by about 35%. The modified sock 50 includes a fire resistant section 51 and a non-fire resistant section or panel 52. The fire resistant section 51 includes the fabric of the present invention, while the non-fire resistant section 52 may include any suitable, non-fire resistant fabric. The modified sock 50 may be designed such as the fire resistant section 51 covers the top 54, lateral walls 55 and a peripheral portion 57 of the bottom side 56 of mattress 59. The non-fire resistant panel 52 of the modified sock 50 may cover a central portion of the bottom side of the mattress 59. The central portion of the bottom of the mattress (the central portion being the portion of the mattress which is about 4 inches from the periphery on each side of the mattress), may not be required to have fire resistant properties under 16 CFR 1633. In one embodiment, the fire resistant section 51 and the non-fire resistant panel 52 may be joined or attached by a connecting structure 62. In one embodiment, the fire resistant section 51 and the non-fire resistant section may be joined or attached by stitch or glue.

During the 16 CFR 1633 test, the mattress or mattress set is placed on top of a steel rig and exposed to two T-shaped burners: a side burner which is applied to the sides of the mattress, and a top burner, which is applied to the top of the mattress. Only a peripheral portion of the side of the mattress (about 4 inches) resting on the steel rig may be exposed to the side burners. Accordingly, fabric beyond this peripheral portion (i.e. the central portion) may not need to include fire resistant properties.

It follows from the previous paragraphs that the present invention covers also fire resistant covers that include a non-fire resistant panel disposed so as to cover a portion of an article that does not require a fire barrier.

As such, in one embodiment, the present invention provides for a fire resistant double-knit sock for covering a mattress. The sock may include a fire resistant section to cover the mattress' top, lateral sides, and a peripheral portion of the bottom side of the mattress, and a non-flame resistant panel designed to cover a central portion of the bottom side of the mattress.

It should be understood that such a modified sock may be designed to cover other objects that may require a fire barrier.

Through the embodiments that are illustrated and described, the currently contemplated best mode of making and using the invention is described. Without further elaboration, it is believed that one of ordinary skill in the art can, based on the description presented herein, utilize the present invention to the full extent.

Although the description above contains many specificities, these should not be construed as limiting the scope of the invention, but as merely providing illustrations of some of the presently embodiments of this invention. Thus the scope of the invention should be determined by the appended claims and their legal equivalents, rather than by the examples given.

All documents cited in this document, including the priority document, are incorporated herein by reference.

The invention claimed is:

1. A fire resistant, double knit fabric comprising three layers: (a) a face side layer comprising a fire retardant (FR) yarn that retains structure when exposed to flame, (b) a back side layer comprising fire resistant rayon, modacrylic and fire retardant cotton, and (c) a middle layer connecting the face and the back sides, the middle layer comprising a middle yarn having at least about 10% charring cellulose fiber or charring wool, wherein the fire resistant double knit fabric is devoid of terry loops and devoid of a melting yarn, and wherein when used to protect an article the back side faces the article, and the face side faces away from the article, wherein when a latex mattress is covered with the fire resistant, double knit fabric, the latex mattress when tested in accordance with 16 CFR 1633, has a maximum heat release rate of less than 200 kW during the first 30 minutes of the test and a total energy release of less than 15 MJ in the first 10 minutes of the test.

2. The fire resistant, double knit fabric of claim 1, wherein the face side comprises the FR yarn wrapped around a structural filament, wherein the structural filament yarns include glass, metal, or ceramic filaments, and wherein the structural filaments are about 100 to 700 denier.

3. The fire resistant, double knit fabric of claim 1, wherein the fire resistant double knit fabric is four-way stretchable.

4. The fire resistant, double knit fabric of claim 1, wherein the fire resistant double knit fabric includes a four way stretch of more than about 20% (ASTM D6614).

5. The fire resistant, double knit fabric of claim 1, wherein the face side comprises a blend of the FR yarn and a charring yarn.

6. The fire resistant, double knit fabric of claim 1, wherein the FR yarn includes inherently flame resistant fibers including modacrylic, flame resistant cellulose meta-aram id, para-aram id, fiberglass, melamine, polybenzimidazole, polybenzoxazole, oxidized polyacrylonitrile fiber (OPF), novoloid, carbon, and combinations thereof.

7. The fire resistant, double knit fabric of claim 1, wherein the FR yarn is a blend of OPF and a char forming cellulose fiber.

8. The fire resistant, double knit fabric of claim 1, wherein the FR yarn is OPF.

9. The fire resistant, double knit fabric of claim 1, wherein the fire resistant double knit fabric includes a four way stretch and recovery of about 150% stretch in fabric width (WALES) and 50% stretch in the fabric length (COURSES).

10. The fire resistant, double knit fabric of claim 1, wherein the fire resistant double knit fabric is devoid of tucking stitches.

11. The fire resistant, double knit fabric of claim 1, wherein the FR yarn includes polybenzoxazole, oxidized polyacrylonitrile fiber (OPF), and the middle yarn comprises charring cellulose fiber or charring wool.

12. The fire resistant, double knit fabric of claim 1, wherein the fire resistant double knit fabric has a mass of about 200 gms/m$^2$ to about 400 gms/m$^2$.

13. The fire resistant, double knit fabric of claim 1, wherein the fire resistant double knit fabric is manufactured in the form of a sock, the sock having an outer surface, an interior and an aperture for receiving an article into the interior of the sock, wherein the outer surface is lined with the face side of the fabric and the interior is lined with the back side of the fabric.

14. The fire resistant, double knit fabric of claim 13, wherein the article is a mattress, and the sock includes a non-fire retardant panel disposed to cover a portion of a mattress not subject to the 16 CFR 1633 requirements.

* * * * *